3,574,661
DISPERSION STRENGTHENED METALS AND
PROCESS FOR MAKING SAME
Gene F. Wakefield, Richardson, Tex., assignor to Texas
Instruments Incorporated, Dallas, Tex.
Filed Sept. 27, 1966, Ser. No. 582,324
Int. Cl. B44d 1/12; C23c 11/00
U.S. Cl. 117—26                        14 Claims

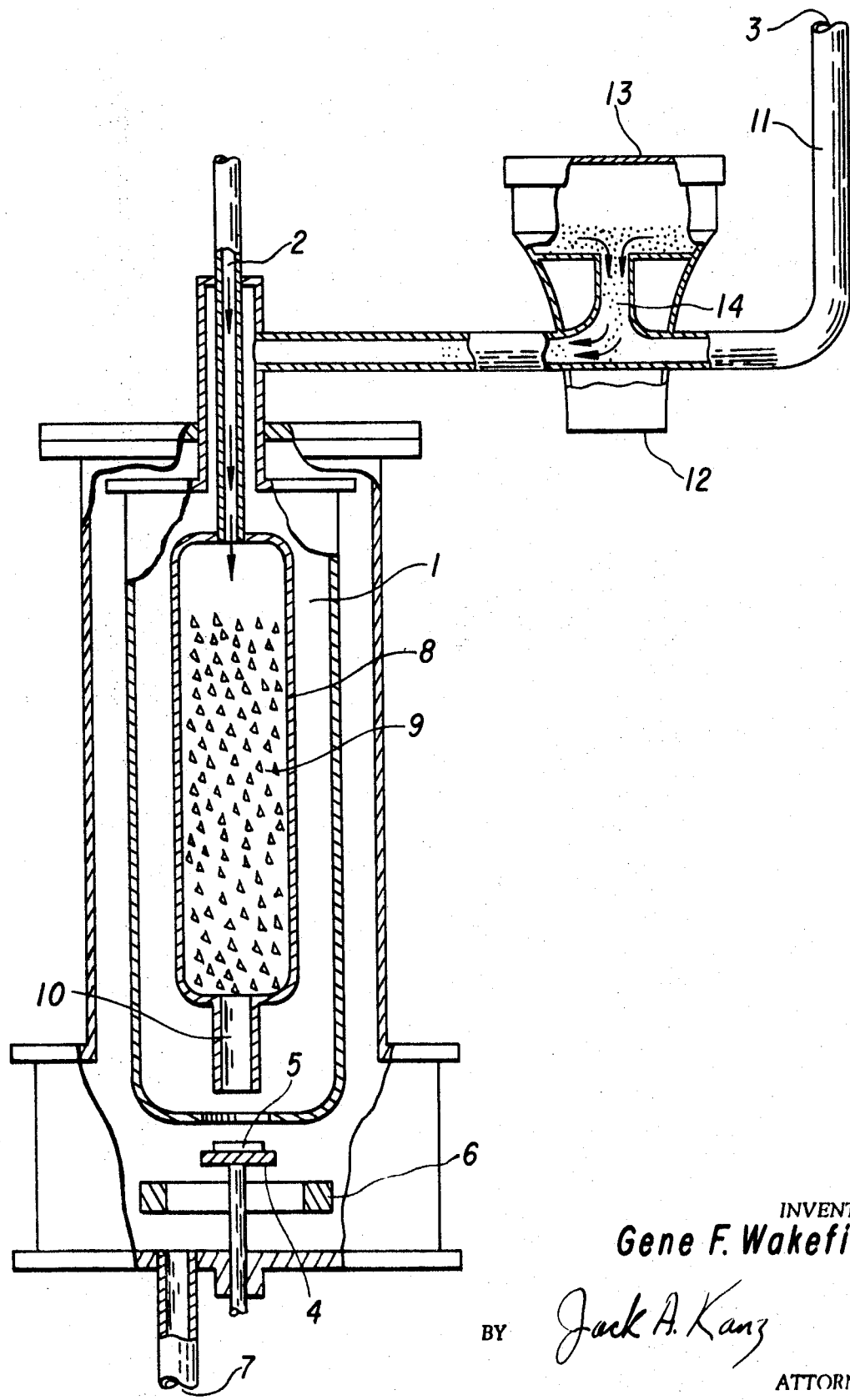

ABSTRACT OF THE DISCLOSURE

A method of providing a strong, ductile, and oxidation-resistant composite by chemically vapor depositing a metal on a substrate in the presence of refractory hard particles which are incorporated in the metal matrix. Exemplary is the decomposition of one or more metal halides by hydrogen reduction in the presence of alumina to incorporate the alumina in the metal matrix and provide a composite having the above-noted properties.

---

This invention relates to a method of producing dispersions in metals, and more particularly to a method of forming composites comprising a base matrix of metal with a refractory hard particle phase. The invention further includes the product made by the method of the invention.

Conventional alloys for use at elevated temperature generally obtain their strength through complex solid solution alloying and precipitation of carbides and intermetallic compounds. The precipitation-strengthened alloys are very strong within the temperature range in which the precipitated base phase is stable. However, when the temperature reaches the point where the precipitate begins to go into solution, the strength of the solid solution that remains decreases rapidly with increasing temperature.

Powder metallurgy techniques of combining refractory hard particles with a metal produce composites which retain their strength at higher temperatures than those formed by precipitation strengthening. However, composites produced by powder metallurgy are not ductile enough to be shaped at room temperature, due to impurities in the base metal—a defect which is inherent in the process. According to the method of the present invention highly stable and insoluble particles are incorporated in the metal matrix through chemical vapor deposition, thereby combining ductility with high strength at elevated temperatures.

Accordingly, an object of the invention is to provide a method of chemically vapor depositing a metal with insoluble refractory hard particles dispersed therein upon a substrate. Another object is to provide a method of simultaneously depositing a metal and refractory hard particles, by the vapor streaming technique of chemical vapor deposition, upon a substrate. Yet another object of the invention is to provide a novel dispersion strengthened material.

Numerous advantages are obtained by the use of the above process. First, the highly desirable properties of ductility, high strength, and oxidation resistance are acquired; secondly, a dispersion composite difficult to fabricate by powder metallurgy techniques can be fabricated by the process of the invention; third, versatility both with respect to compositions and combinations of one or more dispersoid particles is made available; fourth, because the dispersoid is included in the vapor deposition of the matrix, the resulting multiplicity of nucleation sites leads to extremely fine grained deposits; and fifth, the dispersoid, which serves to inhibit recrystallization at high temperatures, increases the expected lifetime of service at high temperatures of those materials such as tungsten and molybdenum which fail due to recrystallization at such high temperatures.

Other objects, features and advantages of the invention will become more readily understood from the following description when read in conjunction with the appended claims and attached drawing in which the sole figure illustrates an apparatuse suitable for practicing the method of the invention and to form the novel product effected by the method.

The figure depicts a coating reactor for the reduction of metallic halides with hydrogen. The reactor is comprised of a furnace 1 containing heaters (not shown) of any suitable type, a halide inlet 2 at the top of the reactor, a reducing hydrogen inlet 3 at the upper part of a side of the reactor, a deposition site 4 for the substrate 5, a substrate heater 6 beneath the furnace which is heated by any suitable means not shown, and an exhaust outlet 7 at the bottom of the reactor.

Mounted within the furnace 1 and secured to the halide inlet 2 is a halide generating chamber 8 made of quartz or other suitable material and containing chromium metal 9 within it, by way of example. Chromium halide vapors are obtained by flowing through inlet 2 an appropriate titanium halide, such as 1 mole percent titanium tetrachloride (TiCl$_4$) by way of example, in an argon or helium stream at a rate of about 5 liters per minute over the chromium metal 9 contained in chamber 8, the chromium metal being heated to about 900° C. A mixture of chromium dichloride and titanium trichloride, which forms as a result of the reaction of chromium metal with TiCl$_4$, exits at the base 10 of the chamber 8, and passes downwardly to the substrate 5 located upon the deposition site 4.

Refractory hard particles may be introduced into the apparatus by any suitable means, such as by flowing or shaking the particles through a fine capillary tube or by passing a vapor stream through a fluidized bed of fine particles. Moreover, the particles may be introduced into either the reducing stream, the halide stream or a separate inert gas carried stream. In the preferred embodiment of the invention, a vibratory feeder 12 is used to introduce the refractory hard particles into the hydrogen line 11. This vibratory feeder is fitted with an air tight lid 13 and a spiral feed track (not shown) within it, equipped with a wiping mechanism which makes it possible to feed refractory hard particles very slowly, for example 10 mg./minute. This vibratory feeder provides a continuous, even flow of a particulate refractory material such as fine (on the order of 0.01–0.1 micron) alumina particles through inlet 14 into the stream of hydrogen in conduit 11, which is maintained at a flow rate of about 5 liters per minute. The alumina particles are then carried downwardly through the furnace 1 in the stream of hydrogen onto the substrate 5 on deposition site 4.

Obviously, the feeder apparatus containing the particulate refractory material may also be connected at the base 10 of the chamber 8 and the material, carried in an inert gas stream, would commingle with the metal halide and the hydrogen (admitted through inlet 3) at the deposition site, that is in the space between the end of the base 10 of the chamber 8 and the area surrounding the substrate 5. Alternatively, the inert gas stream carrying the particulate refractory material can be conveyed by suitable apparatus directly to the deposition site.

Upon reaching the deposition site 4, which is maintained at about 1000–1200° C. by the substrate heater 6, the chromium and titanium chlorides from the halide generating chamber 8 are simultaneously reduced by the hydrogen gas (carrying alumina particles) into a deposit of chromium and titanium metal alloy with fine particles of alumina uniformly dispersed therein, upon the substrate 5 to be coated. For the coating to adhere to the substrate, the latter should be a material which is compatible with the metal to be deposited. The spent gases continue downwardly past the substrate heater 6 and exit through exhaust outlet 7.

The results of examination of chromium-alumina composites prepared in accordance with the method of the invention may be summarized as follows: Electron microscope examination of the composite reveals that the dispersed phase (0.06 micron alumina particles) constitutes approximately 4 volume percent of the deposit. Electron microprobe examination shows that the alumina particles are well distributed throughout the deposit. Hardness tests show Knoop microhardness values of 160 to 260 with a 15 gram load (the same range as that of chromium) which means that the composites may be fabricated like chromium into specific products. The results of the 4T bend test indicate that the substrate with the coating is capable of a 90° bend with no observable fracture, indicating good adherence and ductility. Examination with a light microscope at 500× and 2000× reveals no difference in crystal morphology between the chromium-alumina-composite and a comparable pure chromium coating, and an absence of agglomerations.

In another embodiment of the invention, diamond dust is substituted for the alumina powder in the above description. The resulting chromium diamond dust composite is highly suitable for fabrication into diamond saws or grinding wheels.

While the method of the invention has been described with reference to specific apparatus and reactants, it is to be understood that this description is not to be construed in a limiting sense. Although a composite material of chromium-titanium with dispersoids of alumina and diamond dust have been described, any metal which may be chemically vapor deposited by the vapor streaming technique may be used as the base matrix with any suitable refractory hard particles as the dispersoid. Examples of other metals as a matrix are tungsten, molybdenum and nickel or alloys thereof. Examples of other desirable dispersoids are thoria, yttria and magnesium oxide.

Since the composite materials prepared by the method of the invention exhibit high strength at elevated temperature yet are ductile at room temperature, they are particularly desirable for use in jet engine parts and refractory furnace heating elements. It can be seen that the method of the invention can be used not only to form coatings, but also to prepare bulk deposits which may subsequently be forged or rolled or otherwise fabricated into the desired product, as in conventional powder metallurgy techniques. This dual ability to form both coatings and bulk deposits is an advantage not offered by conventional techniques.

Another use of the process of the invention is the formation of graded coatings wherein each successive layer contains either an increased or decreased concentration of dispersoid. Such a structure aids in obtaining good adhesion, in matching thermal expansion and in increasing oxidation resistance. Various other modifications of the method of the invention will become apparent to persons skilled in the art without departing from the spirit and scope of the invention as defined by the appended claims.

What is claimed is:

1. A method for the formation of a strong, ductile, oxidation-resistant composite by chemically vapor depositing a metal on a substrate in the presence of refractory, non-metal, hard particles which comprises the steps of:
   contacting a heated compatible substrate with a vaporous or gaseous stream having refractory, non-metal, hard particles on the order of 0.01 to 0.1 micron entrained therein, said stream including hydrogen and a vaporous metal halide; while
   maintaining said substrate at a temperature sufficiently high to cause the reduction of said halide, whereby the metal of the metal halide is deposited on said substrate and whereby said refractory particles are simultaneously uniformly dispersed in the deposited metal.

2. The method according to claim 1, wherein said refractory hard particles are entrained in an inert gas stream.

3. The method according to claim 1 wherein said refractory hard particles are entrained in a stream of said at least one halide of said metal.

4. The method according to claim 1, wherein said refractory hard particles are entrained in a stream of hydrogen.

5. The method according to claim 1, wherein said refractory hard particles are fine alumina particles of about 0.06 micron size.

6. The method of claim 1, wherein:
   (a) said refractory hard particles are selected from the group consisting of diamond dust, thoria, yttria, and magnesium oxide.

7. The method according to claim 6, wherein said refractory hard particles are diamond dust particles.

8. The method according to claim 6, wherein said refractory hard particles are fine thoria particles.

9. The method according to claim 6, wherein said refractory hard particles are fine yttria particles.

10. The method according to claim 6, wherein said refractory hard particles are fine particles of magnesium oxide.

11. A method for the formation of a composite structure comprising a metal matrix having a refractory particulate phase dispersed therein including the steps of:
   forming a stream of vapor-entrained particulate solids, said stream comprising hydrogen, vaporous titanium halide, vaporous chromium halide, and alumina particles on the order of 0.01 to 0.1 micron;
   heating a compatible substrate to a temperature of at least 1000° C.; and
   contacting said heated substrate with said stream of vapor-entrained particulate solids whereby titanium metal, chromium metal, and alumina particles are simultaneously co-deposited upon said substrate with the alumina particles uniformly dispersed in the deposited metal.

12. A method for the formation of a metal alloy matrix having refractory, non-metal, hard particles dispersed therein comprising:
   heating a compatible substrate to a temperature of at least 1000° C.; and
   contacting said heated substrate with a gaseous or vaporous stream having refractory, non-metal, hard particles on the order of 0.01 to 0.1 micron entrained therein, said stream including hydrogen, a vaporous metal halide of a first metal, and a vaporous metal halide of a second metal, whereby the hydrogen reduction of said metal halides causes a deposit to form on the substrate, said deposit comprising an alloy of said metals having a refractory, non-metal, hard particle phase uniformly dispersed therein.

13. A method according to claim 12 wherein said metal halides are titanium and chromium chlorides.

14. A method according to claim 12 wherein said metal halides are chlorides of metals taken from the group consisting of molybdenum, tungsten, nickel and mixtures thereof.

References Cited

UNITED STATES PATENTS

| | | | |
|---|---|---|---|
| 3,157,497 | 11/1964 | Spacil | 117—100X |
| 3,166,542 | 1/1965 | Orzechowski et al. | 117—100X |
| 3,175,922 | 3/1965 | Blocher et al. | 117—100X |
| 3,178,308 | 4/1965 | Oxley et al. | 117—107X |
| 3,192,042 | 6/1965 | Spacil | 117—100X |
| 3,201,347 | 8/1965 | Chessick | 117—100X |
| 3,205,177 | 9/1965 | Orzechowski et al. | 117—100X |
| 3,205,178 | 9/1965 | Orzechowski et al. | 117—100X |
| 3,043,679 | 7/1962 | Campbell et al. | 117—100X |
| 3,234,007 | 2/1966 | Blocher et al. | 117—100X |
| 3,288,634 | 11/1966 | Spacil | 117—107.2X |

WILLIAM D. MARTIN, Primary Examiner

E. J. CABIC, Assistant Examiner

U.S. Cl. X.R.

117—107.2